United States Patent [19]

Pflederer

[11] Patent Number: 4,732,371
[45] Date of Patent: Mar. 22, 1988

[54] AXLE MOUNT CONSTRUCTION FOR A FIBER REINFORCED RESIN LEAF SPRING

[75] Inventor: Fred R. Pflederer, Milwaukee, Wis.

[73] Assignee: A. D. Smith Corporation, Milwaukee, Wis.

[21] Appl. No.: 75,233

[22] Filed: Jul. 17, 1987

Related U.S. Application Data

[63] Continuation of Ser. No. 771,835, Sep. 3, 1985, abandoned.

[51] Int. Cl.$^4$ .......................... B60G 11/02; F16F 1/36
[52] U.S. Cl. ........................................ 267/52; 267/148
[58] Field of Search ........................ 267/47, 48, 49, 50, 267/52, 53, 148, 149; 280/669, 694, 699, 718, 719, 720

[56] References Cited

U.S. PATENT DOCUMENTS

| | | | |
|---|---|---|---|
| 1,542,756 | 6/1925 | Anthes | 267/47 X |
| 1,546,584 | 7/1925 | Hutt | 267/47 |
| 3,056,706 | 10/1962 | Knoppel | 174/177 |
| 3,142,598 | 7/1964 | Rosen | 267/47 X |
| 3,376,033 | 4/1968 | Sherwood | 267/47 |
| 3,968,958 | 7/1976 | Huchette et al. | 267/47 |
| 4,114,962 | 9/1978 | König et al. | 156/172 X |
| 4,414,049 | 11/1983 | Jones | 267/148 X |
| 4,468,014 | 8/1984 | Strong | 267/47 |
| 4,519,591 | 5/1985 | Bush et al. | 267/149 X |
| 4,546,958 | 10/1985 | Ohno et al. | 267/47 |

FOREIGN PATENT DOCUMENTS 474985 11/1937 United Kingdom .

Primary Examiner—Andres Kashnikow
Assistant Examiner—Robert J. Oberleitner
Attorney, Agent, or Firm—Andrus, Sceales, Starke & Sawall

[57] ABSTRACT

An axle mount construction for a fiber reinforced resin leaf spring. The central section of the molded fiber reinforced resin spring that is adapted to be secured to an axle of a vehicle is molded with alternate longitudinally extending ridges and grooves with the ridges on one surface of the central section being vertically aligned with grooves on the opposite surface. The outer extremities of the ridges define flat lands, and a clamping mechanism secured the central section of the spring to the axle and includes clamping plates which are engaged with the lands on the ridges. The ridge and groove construction provides added section stiffness to the mounting area of the spring to reduce stress concentrations in the spring under load.

8 Claims, 4 Drawing Figures

AXLE MOUNT CONSTRUCTION FOR A FIBER REINFORCED RESIN LEAF SPRING

This is a continuation of application Ser. No. 06/771,835, filed Sept. 3, 1985, now abandon.

BACKGROUND OF THE INVENTION

Recently there has been considerable activity in the development of fiber reinforced resin leaf springs to replace the traditional steel leaf spring, as used in vehicles. Fiber reinforced resin leaf springs are normally formed by winding continuous strands of fibrous material impegnated with an uncured thermosetting resin about a pair of spaced bushings. After the desired number of layers have been wound on the bushings, the wound structure is molded under heat and pressure to cure the resin and form the leaf spring.

It is extremely important that when the spring is assembled to the vehicle, that there are no stress concentrations in the spring, for stress concentrations can cause rupture of the fibers and a loss of mechanical properties.

It has been found that when a fiber reinforced resin leaf spring is clamped to the vehicle axle using a conventional clamping mechanism, the gripping action is so strong that stress concentrations arise in the spring, particularly where the ends of the metal clamp engage the spring.

To eliminate stress concentrations at the clamping area, it has been proposed to enclose the central portion of the spring in an elastomeric jacket which serves to cushion the spring and prevent high stress concentrations during loading. However, the use of the elastomeric jacket prevents a conventional clamping mechanism from being used and requires special clamping equipment. Moreover, the elastomeric jacket adds to the overall cost of the clamping structure.

As a further problem, axial slippage can occur between the fiber reinforced resin spring and the clamping mechanism as the conventional U-bolts straddle the spring. Forming holes in the spring to receive the U-bolts, is not practical as it will sever the fibrous material and result in a loss of mechanical properties.

SUMMARY OF THE INVENTION

The invention is directed to an improved axle mounting construction for a fiber reinforced resin leaf spring. In accordance with the invention, the central portion of the spring, which is to be connected to the axle, is molded with alternate longitudinally extending ridges and grooves, with the ridges on one surface of the central section being in vertical alignment with the grooves on the opposite surface. The outer extremities of the ridges define flat lands, and similarly, the bottoms of the grooves are provided with generally flat valleys.

A conventional axle clamping mechanism can be used to clamp the central section of the spring to the axle. A plate associated with the axle mounting bracket engages the lands on the ridges on the lower surface of the spring, while a clamping plate engages the lands on the ridges on the upper surface of the spring. Conventional U-bolts serve to connect the plates together and secure the spring to the axle.

Due to the ridge and groove construction, the central section of the spring has increased section stiffness which substantially reduces bending stresses under load and enables the conventional U-bolt clamping mechanism to be employed.

Because of the increased section stiffness, locator grooves can be formed in the central section of the spring without effecting the mechanical properties of the spring. The locator grooves aid in preventing axial slippage between the spring and the axle mount mechanism.

The increased section stiffness in the central portion of the spring is achieved in a manner such that the spring has a uniform cross-sectional area throughout its length, including the axle mount area.

Other objects and advantages will appear in the course of the following description.

DESCRIPTION OF THE DRAWINGS

The drawings illustrate the best mode presently contemplated of carrying out the invention.

In the drawings

DESCRIPTION OF THE PREFERRED EMBODIMENT

Figure 1:
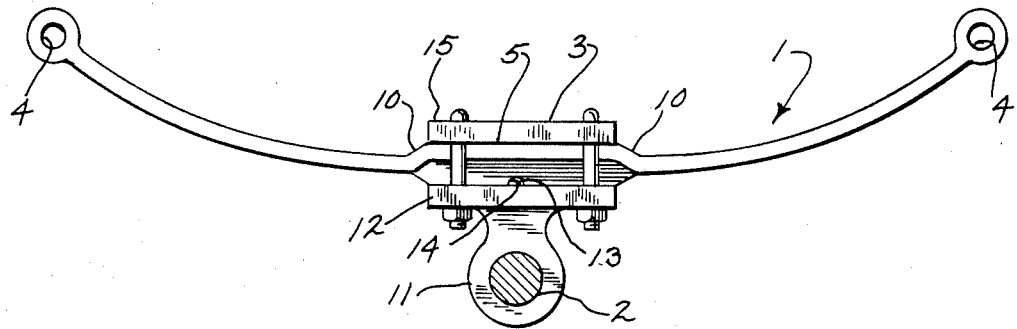
FIG. 1 is a side elevation of a leaf spring incorporating the axle mounting construction of the invention.

The drawings illustrate a fiber reinforced resin leaf spring 1 which is adapted to be attached to an axle 2 of a vehicle through an axle mounting mechanism 3. As shown in FIG. 1, the ends of spring 1 are curved upwardly and are provided with bushings 4 that are adapted to receive fastners to connect the spring 1 to the frame of the vehicle.

Spring 1 is preferably formed of continuous strands of fibrous reinforcing material bonded by a thermosetting resin. The fibrous material can take the form of glass fibers, while the thermosetting resin may be an epoxide, vinylester or polyester resin.

In forming the spring 1, the strands of the fibrous material impregnated with the liquid thermosetting resin are wound around a pair of spaced bushings 4 in a series of wraps or loops. After the desired number of windings have been made, the upper and lower runs extending between the bushings are brought together in a mold, and the wound structure is then molded, preferably under heat and pressure, to cure the resin and provide the spring construction, as illustrated in FIG. 1.

Figure 3:
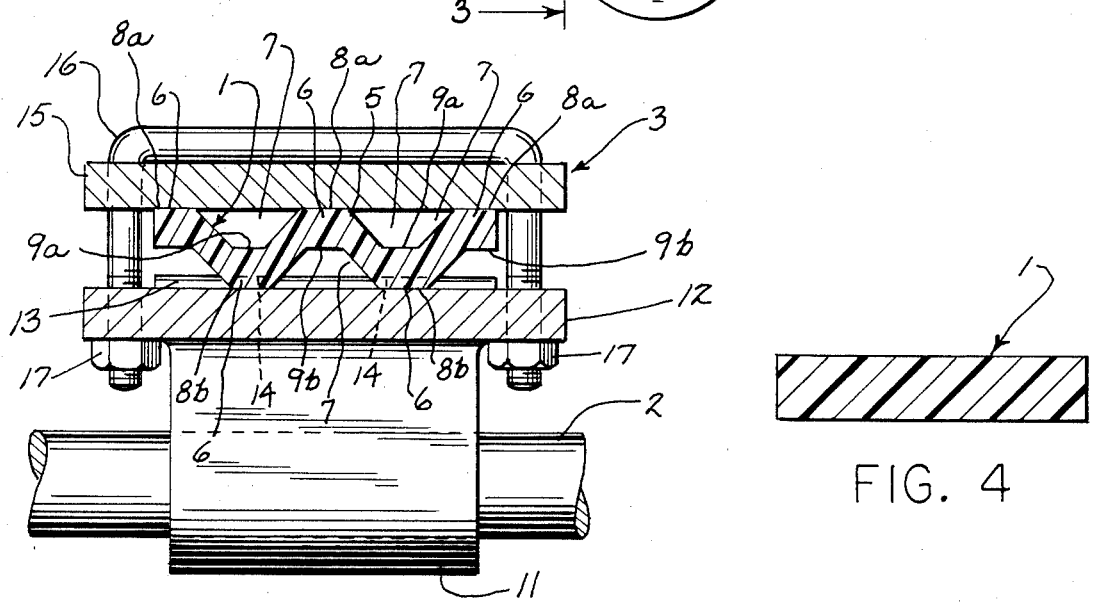
FIG. 3 is a section taken along line 3—3 of FIG. 2.

In accordance with invention, the central section 5 of spring 1, which is connected to axle 2 through the mounting mechanism 3, is formed with a plurality of longitudinally extending ridges 6 and grooves 7. As shown in FIG. 3, the ridges 6 on one surface of the spring are in vertical alignment with grooves 7 on the opposite surface of the spring. The outer extremities of ridges 6 define generally flat lands 8 and the lands 8a on the upper ridges lie in a common plane, while similarly, the lands 8b on the lower ridges lie in a second common plane.

The bottoms of the grooves 7 define flat surfaces or valleys 9, as shown in FIG. 3, and the depth of the grooves is substantially equal to one-half the thickness of the spring, so that the bottoms of the grooves lie substantially on the neutral axis of the spring.

As illustrated, central section 5 is formed with three upwardly extending ridges 6 and two downwardly extending ridges 6 which provide the central section with a generally W-shaped configuration. However, it is contemplated that any number of ridges and grooves can be employed, depending on the size and shape of the spring.

Figure 2:
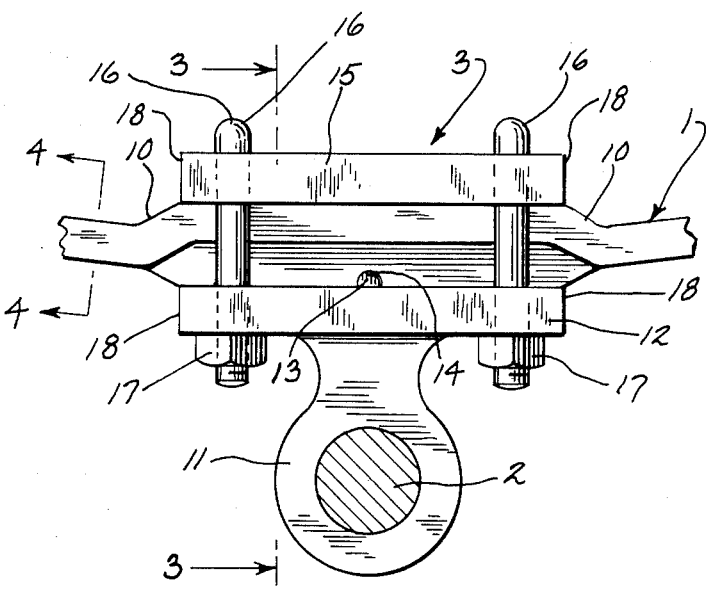
FIG. 2 is an enlarged fragmentary side elevation of the central portion of the spring as attached to the axle.

As best shown in FIG. 2, ridges 6 and grooves 7 merge longitudinally into the main body of the spring through the tapered regions 10 located on either side of central section 5.

Figure 4:
FIG. 4 is a section taken along line 4—4 of FIG. 2.

The main portion of spring 1 has a generally rectangular configuration, as shown in FIG. 4, and the cross sectional area of spring 1 is substantilly uniform throughout its length from bushing to bushing.

Axle mounting mechanism 3 incldues an axle mounting bracket 11 which receives axle 2 and the upper portion of bracket 11 defines a lower clamping plate 12 which is engaged with the lands 8b. Plate 12 is formed with a transverse locator ridge 13 which is received within grooves 14 in the lower ridges 6. Engagement of the locator ridge 13 with grooves 14 aids in preventing axial slippage between spring 1 and axle mounting bracket 11.

The axle mounting mechanism also includes an upper clamping plate 15 which is engaged with lands 8a of ridges 6, and a pair of conventional U-bolts extend through aligned openings in plates 12 and 15. The ends of the U-bolts 16 receive nuts 17, and by tightening down the nuts 17 the spring 1 will be firmly clamped to the axle 2.

The ridge and groove construction in central section 5 provides increased section stiffness in the axle mount area of the spring which enables the metal plates 12 and 15 to be directly engaged with lands 8a and 8b. Because of the increased stiffness of the central section, bending stress of the central clamped section is reduced. More specifically, due to the increased section stiffness provided by the ridges and grooves, the portions of the spring located beneath the ends 18 of the plates 12 and 15 will be subjected to reduced bending stress, even when clamping stress concentrations are applied. Therefore, a conventional clamping mechanism can be utilized to attach the spring to the axle and no auxiliary parts are required, which reduces the overall cost of the clamping mechanism.

As the axle mounting area 5 of the spring has increased stiffness there will be no movement or flexing of this section under load. Thus, locator grooves or holes can be provided in central section 5 without causing early failures.

Various modes of carrying out the invention are contemplated as being within the scope of the following claims particularly pointing out and distinctly claiming the subject matter which is regarded as the invention.

I claim:

1. An axle mounting construction for a fiber reinforced resin leaf spring, comprising an integrally molded leaf spring composed of fiber reinforced thermosetting resin and having a central mounting section disposed to be secured to an axle of a vehicle and having a pair of ends disposed to be attached to a frame of the vehicle, said central section having alternate longitudinally extending ridges and grooves with the ridges on one surface of said central section being vertically aligned with grooves on the opposite surface of said section to provide increased section stiffness for said central section, the outer extremities of said ridges defining generally flat lands, and clamping means engaged with said lands on both of said surfaces for clamping the spring to said axle, said ridges and grooves terminating substantially immediately adjacent opposite sides of said clamping means and portions of said spring extending longitudinally outward from the respective sides of said clamping means to the respective ends being generally rectangular in cross section, said spring having a substantially uniform cross sectional area throughout its length including said central section.

2. The construction of claim 1, wherein said lamping means includes a pair of clamping plates, said lates being disposed aganist the corresponding flat lands of said ridges.

3. The construction of claim 1, wherein said central section has a generally W-shaped cross section.

4. The construction of claim 1, wherein the bottoms of the grooves define flat surfaces that lie substantially on the neutral axis of said spring.

5. An axle mounting construction for a fiber reinforced resin leaf spring, comprising an integrally formed leaf spring composed of fiber reinforced thermosetting resin and having a central mounting section disposed to be secured to the axle of a vehicle and having a pair of ends disposed to be attached to a frame of the vehicle, said central section having alternate longitudinally extending ridges and grooves with the ridges on the upper surface of said central section being in vertical alignment with the grooves in the bottom surface of said section, the outer extremities of said ridges defining flat lands, the depth of said grooves in said central mounting section being substantially equal to one-half the thickness of the spring so that the bottoms of the grooves lie substantially on the neutral axis of said spring, and clamping means engaged with the lands of both the upper and bottom surfaces of the central section for clamping the spring to the axle, said spring having a substantially uniform cross sectional area throughout its length including said central section.

6. The construction of claim 5, and including locating means for preventing relative longitudinal movement between said spring and said clamping means.

7. The construction of claim 6, wherein said locating means comprises a transverse rib formed on said clamping means, and a plurality of aligned transverse grooves formed in said ridges and disposed to receive said rib on said clamping means.

8. A mounting construction for a fiber reinforced resin leaf spring, comprising a leaf spring composed of a fiber reinforced thermosetting resin and having a mounting section disposed to be secured to a vehicle and having a pair of ends spaced from said mounting section, said mounting section having alternate longitudinally extending ridges and grooves to provide increased section stiffness for said mounting section, the outer extremities of said ridges defining lands, and clamping means engaged with said lands for clamping the spring to said vehicle, said ridges and grooves terminating substantially immediately adjacent opposite sides of said clamping means and portions of said spring extending longitudinally outward from the respective sides of said clamping means to the respective ends being generally rectangular in cross section, said spring having a substantially uniform cross sectional area throughout its length including said mounting section.

* * * * *

UNITED STATES PATENT AND TRADEMARK OFFICE
CERTIFICATE OF CORRECTION

PATENT NO. : 4,732,371
DATED : March 22, 1988
INVENTOR(S) : FRED R. PFLEDERER

It is certified that error appears in the above-identified patent and that said Letters Patent is hereby corrected as shown below:

Front Page at "[73] Assignee" Cancel "A. D. Smith Corporation" and substitute therefor ---A. O. SMITH CORPORATION---;

In the ABSTRACT, Line 9, Cancel "secured" and substitute therefor ---secures---

Signed and Sealed this

Twentieth Day of December, 1988

Attest:

DONALD J. QUIGG

*Attesting Officer*  *Commissioner of Patents and Trademarks*